(12) United States Patent
Kamo (10) Patent No.: US 6,385,167 B1
(45) Date of Patent: May 7, 2002

(54) ATM SWITCH AND METHOD FOR CONTROLLING BANDWIDTH AND CONNECTION QUALITY ATM CONNECTION

(75) Inventor: Toshiyuki Kamo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/286,333

(22) Filed: Apr. 5, 1999

(30) Foreign Application Priority Data

Aug. 13, 1998 (JP) .......................................... 10-228821

(51) Int. Cl.⁷ .......................... H04L 1/00; G01R 31/08; G06F 11/00
(52) U.S. Cl. ........................ 370/228; 370/395; 370/419
(58) Field of Search ............................... 370/217, 218, 370/219, 220, 225, 226, 227, 228, 351, 389, 395, 419, 431, 433, 437, 463, 465, 386

(56) References Cited

U.S. PATENT DOCUMENTS

| | | | |
|---|---|---|---|
| 5,787,072 A | * | 7/1998 | Shimojo et al. ............ 370/231 |
| 5,867,663 A | * | 2/1999 | McClure et al. ............ 370/413 |
| 6,101,167 A | * | 8/2000 | Shimada .................... 370/225 |
| 6,041,037 A1 | * | 3/2001 | Nishio et al. ................ 370/228 |
| 6,282,197 B1 | * | 8/2001 | Takahashi et al. .......... 370/395 |

FOREIGN PATENT DOCUMENTS

JP          5-122675          5/1993

* cited by examiner

*Primary Examiner*—Ricky Ngo
(74) *Attorney, Agent, or Firm*—Rosenman & Colin LLP (57) ABSTRACT

There is provided an ATM switch including: an input line unit for terminating ATM cells input via an input connection; an output line unit for outputting ATM cells to an output connection; and a switch unit for switching a first ATM connection formed by linking a first input connection with a first output connection via a first internal connection, to a second ATM connection, which has the same bandwidth and quality as the first ATM connection, formed by linking a second input connection with a second output connection via the first internal connection. With this arrangement, when the first ATM connection is changed by channel switching to the second ATM connection, the first internal connection at the first ATM connection before the switching is employed for the linking of the second input connection with the second output connection at the second ATM connection. Therefore, the process for releasing the first internal connection and the process for setting a new internal connection are not required, and the ATM connection can be switched in a moment.

14 Claims, 9 Drawing Sheets

| VPI | VCI | OTAG | OVPI | OVCI | QTAG | QVPI | QVCI |
|---|---|---|---|---|---|---|---|
| VPIa | VCIa | TAGc | OVPIc | OVCIc | QTAGab | QVPIab | QVCIab |
| VPIb | VCIb | TAGd | OVPId | OVCId | QTAGab | QVPIab | QVCIab |

FIG. 6A

| VPI | VCI | OTAG | OVPI | OVCI | QTAG | QVPI | QVCI |
|---|---|---|---|---|---|---|---|
| VPIx | VCIx | TAGx | OVPIx | OVCIx | QTAGx | QVPIx | QVCIx |

FIG. 6B

| VPI | VCI | OTAG | OVPI | OVCI | QTAG | QVPI | QVCI |
|---|---|---|---|---|---|---|---|
| VPIa | VCIa | TAGc | OVPIc | OVCIc | QTAGab | QVPIab | QVCIab |
| VPIb | VCIb | TAGd | OVPId | OVCId | QTAGab | QVPIab | QVCIab |

FIG. 7

| QCPID | VPI | VCI | OTAG | OVPI | OVCI | QTAG | QVPI | QVCI |
|---|---|---|---|---|---|---|---|---|
| QCPIDa | VPIa | VCIa | TAGc | OVPIc | OVCIc | QTAGab | QVPIab | QVCIab |
| QCPIDa | VPIb | VCIb | TAGd | OVPId | OVCId | QTAGab | QVPIab | QVCIab |

FIG. 8

| 8 | 7 | 6 | 5 | 4 | 3 | 2 | 1 | Bit<br>Byte |
|---|---|---|---|---|---|---|---|---|
| Generic Flow Control (GFC) | | | | Path Identifier (VPI) | | | | 1 |
| Path Identifier (VPI) | | | | Channel Identifier (VCI) | | | | 2 |
| Channel Identifier (VCI) | | | | | | | | 3 |
| Channel Identifier (VCI) | | | | PT | | | CLP | 4 |
| Header Checksum (HEC) | | | | | | | | 5 |

| 8 | 7 | 6 | 5 | 4 | 3 | 2 | 1 | |
|---|---|---|---|---|---|---|---|---|
| 0 | Information element identifier ||||||| Byte 1 |
| 0/1 ext | Length of Information element identifier (bytes) ||||||| Byte 2 |
| 1 ext | Coding Standard || Information element Instruction Field |||||Byte 3 |
| | || Flag | Res | Soare | Action indicator || |
| QCCNID ||||||||Byte 4-n |

FIG. 10B

| Byte 1 Information Field Identifier ||
|---|---|
| Bits    8 7 6 5 4 3 2 1 | |
| 0 1 0 1 0 0 0 0 | Locking shift |
| 0 1 0 1 0 0 0 1 | Non-Loking Shift |
| 0 1 0 1 0 0 1 1 | Sending complete |
| 0 1 0 1 0 1 0 1 | Repeat indicator |
| 0 1 0 1 1 0 0 0 | ATM-Adaption Layer Parameter |
| 0 1 0 1 1 0 0 1 | ATM User Ceil Rate |
| 0 1 0 1 1 0 1 0 | Connection Identifier |
| 0 1 0 1 1 1 0 0 | Quality of Service Parameter |
| 0 1 0 1 1 1 1 0 | Broadband Bearer Capability |
| 0 1 0 1 1 1 1 1 | Broadband Low Layer Information(B-LLI) |
| x x x x x x x x | QCCNID |

ATM SWITCH AND METHOD FOR CONTROLLING BANDWIDTH AND CONNECTION QUALITY ATM CONNECTION

BACKGROUND OF THE INVENTION

1. Field of the Invention

The present invention relates to an asynchronous transfer mode (ATM) switch, and in particular to a method for controlling the bandwidth and the quality of the ATM connection for an ATM switch.

2. Related Arts

Currently, next generation communication networks are gradually being introduced which employ asynchronous transfer mode (ATM) switches, for which ATM techniques are applied. ATM switching is a communication method employed for the transfer, using hardware switching, of data cells, each of which is composed of a predetermined series of 48 bytes to which is added a header comprising five information control bytes.

ATM switches are presently in widespread use for LANs/WANs and on the Internet, and it is expected that in the future they will be employed for other types of data exchange, such as VOD (Video On Demand).

Figure 11:
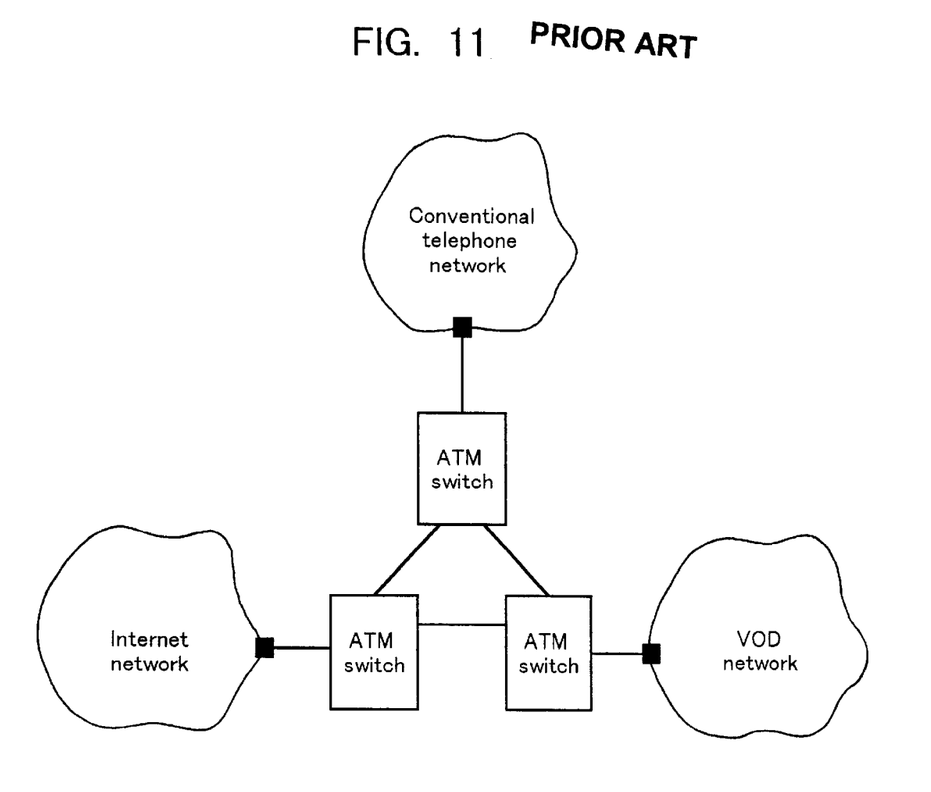
FIG. 11 is a diagram showing the configuration of an ATM network system.

FIG. 11 is a diagram illustrating the configuration of an ATM network system. In FIG. 11, a conventional telephone network, an Internet network and a VOD network are interconnected via ATM switches.

The employment of ATM switching is gradually being shifted away from its currently primary objective of providing PVC (Permanent Virtual Channel) services for dedicated lines and is increasingly being used to provide SVC (Switched Virtual Channel) services. For such a service, an ATM connection, which is set up each time a request is received from a subscriber, is an independent entity, and bandwidth and quality are controlled for each connection.

The facilities provided by VOD, which is a product of an ATM connection, and a broadcast multimedia service can be compared with a current television (TV) service by radio waves. Once a user powers on a television, with the facilities provided by the TV he or she can immediately view a program broadcast on a desired channel. And switching channels can be effected immediately by, for example, manipulating buttons on a remote controller. This is possible because since each channel employs an individual radio frequency band and uses the same bandwidth and transmission quality for simultaneous transmissions, a specific channel can immediately be selected merely by performing a frequency adjustment. However, when such an immediate channel switching VOD service has been provided via an ATM connection, the following problem has arisen.

Figure 12:
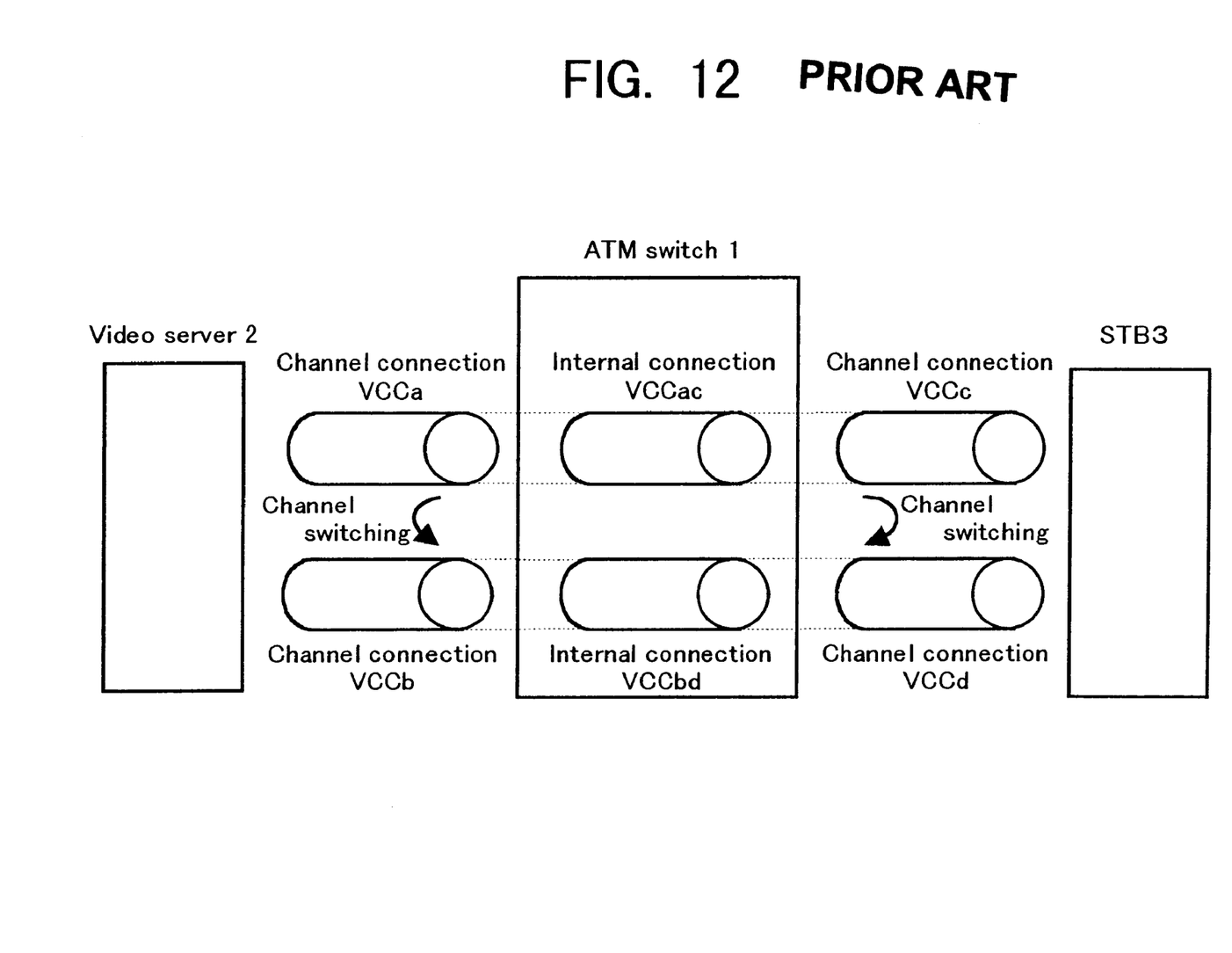
FIG. 12 is a diagram for explaining the conventional switching performed by ATM connections.

FIG. 12 is a diagram for explaining a conventional ATM connection. In FIG. 12, for example, video data for a film are transmitted by a video server 2, which provides a film channel, via an ATM switch 1 to an STB (Set Top Box) 3, which is a subscriber terminal. With the service provided by VOD, when the STB 3 requests an ATM connection corresponding to a specific channel, the ATM switch 1 provides a link via a channel connection (VCCa), which is provided between the video server 2 and the ATM switch 1, to a channel connection (VCCc), which is provided between the STB 3 and the ATM switch 1, effected by an internal connection (VCCac) in the ATM switch 1 which controls the bandwidth and the quality of the channel connection.

The bandwidth is defined by, for example, a transfer speed (e.g., 1 Mbps), and the quality is defined by a cell loss ratio (e.g., $10^{-10}$).

When the STB 3 requests the switching of channels, as is shown in FIG. 12 the ATM switch 1 must change the ATM connection from a pre-switching channel connection (VCCa and VCCc) to a post-switching channel connection (VCCb and VCCd). Specifically, the ATM switch 1 must temporarily release the channel connection (VCCa and VCCc) and the internal connection VCCac, and then set up the internal connection VCCbd which is linked with the post-switching channel connection (VCCb and VCCd). The process of releasing the control of the bandwidth and the quality at the ATM switch 1 is required by the process for releasing the internal connection, and the setting of the bandwidth and the quality at the ATM switch 1 is required by the process for setting the post-switching internal connection. Thus, for these processes a specific period of time is required, and as a result, compared with the TV service, when channels for the VOD service are switched a time lag occurs that prevents channel switching from being satisfactorily performed.

One solution that has been proposed is for the ATM connection for all the channels to be set in a linked state in advance, so that at the ATM connection the switching of channels in a moment is possible. However, since in this case the bandwidth of the ATM connection would be wastefully employed, this is an unrealistic proposal.

SUMMARY OF THE INVENTION

It is, therefore, one objective of the present invention to provide an ATM switch for the switching in a moment of an ATM connection at the time channels are switched, and to provide a method for controlling the bandwidth and the quality of an ATM connection.

To achieve the above objective, according to the present invention, an ATM switch which forms ATM connection by linking an input connection with an output connection via an internal connection for controlling the bandwidth and the quality of the ATM connection, comprises:

an input line unit for terminating ATM cells input via the input connection;

an output line unit for outputting the ATM cells to the output connection; and a switch unit for switching a first ATM connection formed by linking a first input connection with a first output connection via a first internal connection, to a second ATM connection, which has the same bandwidth and quality as the first ATM connection, formed by linking a second input connection with a second output connection via the first internal connection.

With this arrangement, when the first ATM connection is changed by channel switching to the second ATM connection, the first internal connection at the first ATM connection before the switching is employed for the linking of the second input connection with the second output connection at the second ATM connection. Therefore, the process for releasing the first internal connection and the process for setting a new internal connection are not required, and the ATM connection can be switched in a moment.

For example, the input line unit comprises a converter for converting input connection information included in the ATM cells input from the input connections into output connection information, and for obtaining a bandwidth and quality information for the ATM connection based on the input connection information. And the switch unit links the second input connection with the second output connection via the first internal connection in case that the bandwidth and quality information for the second ATM connection is the same as a bandwidth and quality information for the first ATM connection.

Preferably, the converter has a memory which stores table data for the output connection information and the bandwidth and quality information for the ATM connections which are set in accordance with the input connection information, and from which it obtains the bandwidth and quality information.

In addition, to achieve the above objective, a method for controlling the bandwidth and the quality for an ATM connection formed by linking an input connection with an output connection via an internal connection for controlling the bandwidth and the quality of the ATM connection, comprises the steps of:

linking a first input connection with a first output connection via a first internal connection for controlling the bandwidth and quality of a first ATM connection; and linking a second input connection with a second output connection via the first internal connection when the first ATM connection is switched to a second ATM connection which has the same bandwidth and the same quality as the first ATM connection.

In addition, the method for controlling the bandwidth and the quality of the ATM connections may comprise the steps of:

obtaining a bandwidth and quality information for the first ATM connection and a bandwidth and quality information for the second ATM connection based on input connection information included in ATM cells input from the first and second connections respectively; and comparing the bandwidth and quality information for the first ATM connection with the bandwidth and quality information for the second ATM connection.

The method for controlling the bandwidth and the quality of the ATM connections may further comprises the step of:

linking the second input connection with the second output connection via a second internal connection for controlling bandwidth and quality for the second ATM connection, when, at the comparison step, the bandwidth and quality information for the first ATM connection is different from the bandwidth and quality information for the second ATM connection.

Other features and advantages of the present invention will become readily apparent from the following description when taken in conjunction with the accompanying drawings.

DETAILED DESCRIPTION OF THE PREFERRED EMBODIMENT

The preferred embodiment of the present invention will now be explained. It should be noted, however, that the technical scope of the present invention is not limited to this embodiment.

Figure 1:
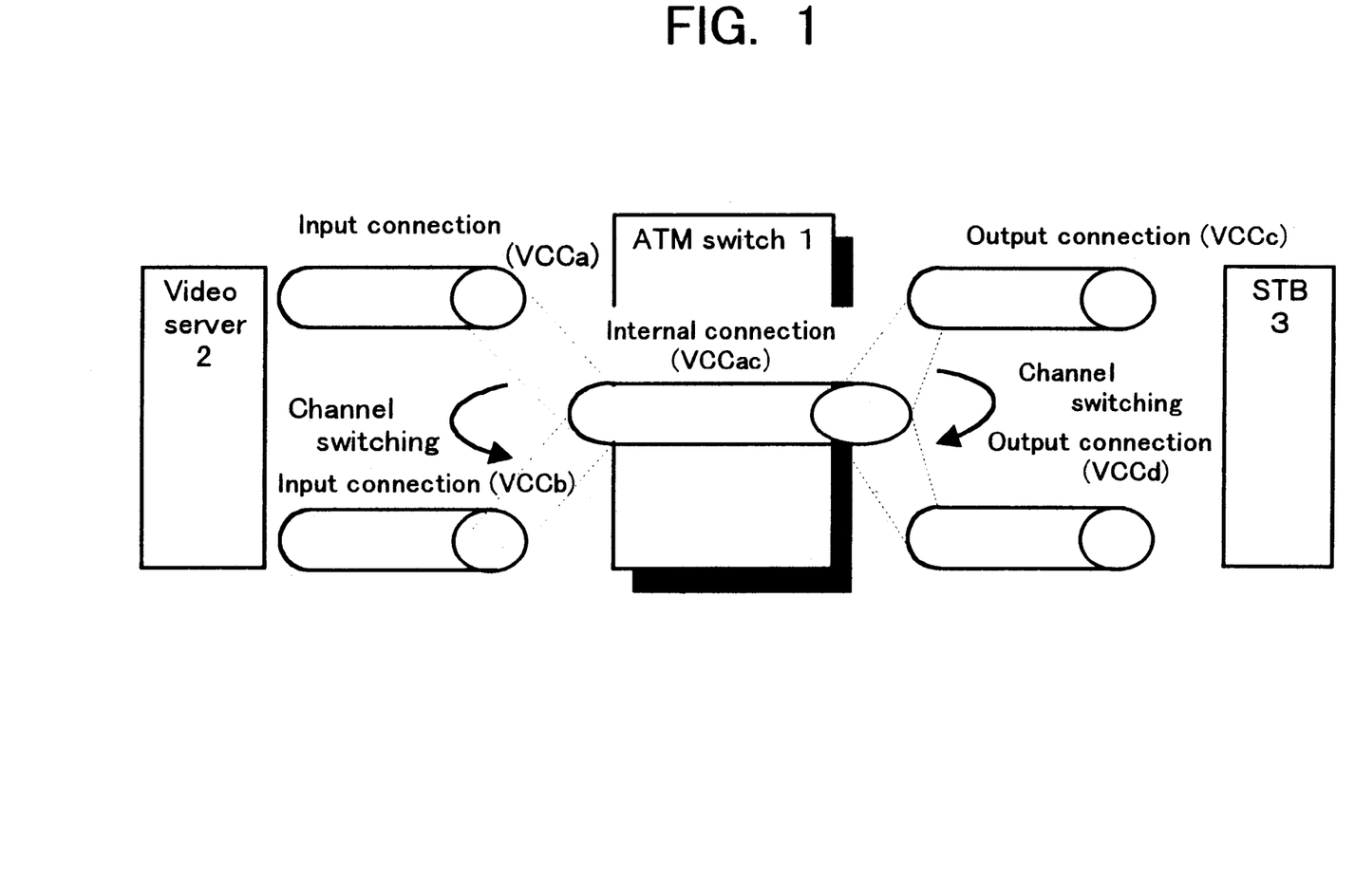
FIG. 1 is a diagram for explaining the principle of an ATM connection according to one embodiment of the present invention.

FIG. 1 is a diagram for explaining the principle of the control for an ATM connection according to the embodiment of the present invention. In FIG. 1, video data are transmitted by a video server 2, which provides, for example, a movie channel, via an ATM switch 1 to an STB 3, which is a subscriber terminal.

When the STB 3 requests an ATM connection for a specific channel, via an internal connection (VCCac) the ATM switch 1 links an input connection (vCCa), between the video server 2 and the ATM switch 1, to an output connection (VCCc), between the STB 3 and the ATM switch 1, at the ATM switch 1 in order to control the quality and the bandwidth for the input/output connections (VCCa and VCCc). In this specification, the ATM connection represents a connection formed by linking the input connection with the output connection via the internal connection.

Next, the STB 3 requests a channel switching. Then, in the conventional manner, the ATM switch 1 changes the pre-switching input connection (VCCa) to the post-switching input connection (VCCb), and changes the pre-switching output connection (VCCc) to the post-switching output connection (VCCd).

The ATM switch 1 in this embodiment links together the post-switching input/output connections (VCCb and VCCd) via the pre-switching internal connection VCCac in order to link together the pre-switching input/output connections (VCCa and VCCc).

Since the ATM switch 1 switches channels without performing a release process and a setup process for the internal connection which controls the bandwidth and the quality of the ATM connection, channels can be switched in a moment.

The ATM connections for the individual channels provided by the VOD server 2 normally have the same bandwidth and quality. Therefore, the internal connection Vccac for the pre-switching ATM connection can be used for the post-switching ATM connection.

As is described above, in this embodiment, for channel switching, the ATM switch 1 does not release the internal connection which controls the bandwidth and the quality of the pre-switching ATM connection, and employs the same internal connection to control the bandwidth and the quality for the post-switching ATM connection. As a result, channel switching can be performed immediately.

Since during the process for changing the pres-witching input connection (VCCa) to the post-switching input connection (VCCb) and for changing the pre-switching output connection (VCCc) to the post-switching output connection (VCCd) only a VPI (virtual path identifier) and a VCI (virtual channel identifier), which are included in the header of an ATM cell, are rewritten, almost no time is required. The VPI and VCI are identification symbols, which are virtually set in lines, for identifying an ATM connection.

Figure 2:
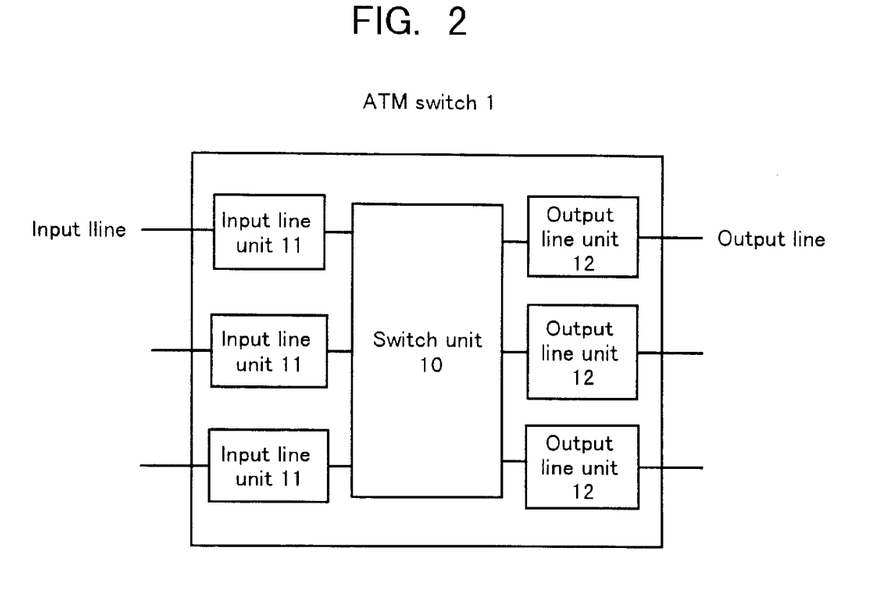
FIG. 2 is a block diagram illustrating the arrangement of an ATM switch according to the embodiment of the present invention.

FIG. 2 is a block diagram illustrating the arrangement of the ATM switch 1 according to the embodiment. In FIG. 2, the ATM switch 1 includes a switch unit 10, input line units 11 and output line units 12. Based on VPIs (virtual path identifiers) and VCIs (virtual channel identifiers) included in the headers of the ATM cells, The switch unit 10 performs the hardware switching of the ATM cells received from the input units 11.

Figure 3:
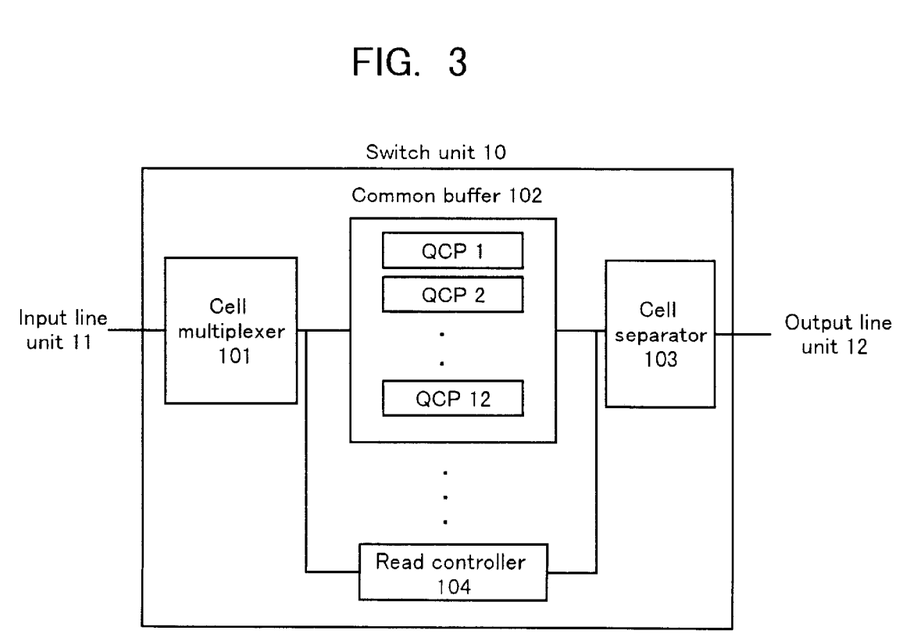
FIG. 3 is a block diagram showing the arrangement of a switch unit.

FIG. 3 is a block diagram illustrating the switch unit 10. In FIG. 3, ATM cells transmitted via the input connections of the input line units 11 are multiplexed by a cell multiplexer 101, and the results are stored in a common buffer 102. A read controller 104 reads an ATM cell from the common buffer 102 in accordance with the quality of the ATM connection for the stored ATM cell. The ATM cell which is read is divided at a cell separator 103, and the divided cell is output via the output line units 12 to the output connections. The connection of the cell multiplexer 101, the common buffer 102 and the cell separator 103 corresponds to the internal connection. That is, the internal connection controls the bandwidth and the quality of the ATM connection by performing the reading the ATM cell at the read controller 104.

More specifically, as is shown in FIG. 3, in accordance with the quality of the ATM connection, the common buffer 102 includes areas which correspond to a plurality of classes (e.g., 12 levels (QCP1 to QCP12)). In accordance with the quality classes for the individual areas, to read the ATM cells stored in these areas the read controller 104 changes the frequency and the reading speed.

The input line units 11 and the output line units 12 respectively terminate the input lines and output lines along which the ATM cells are transferred, and serve as interfaces between both of the lines and the switch unit 10.

Figure 4:
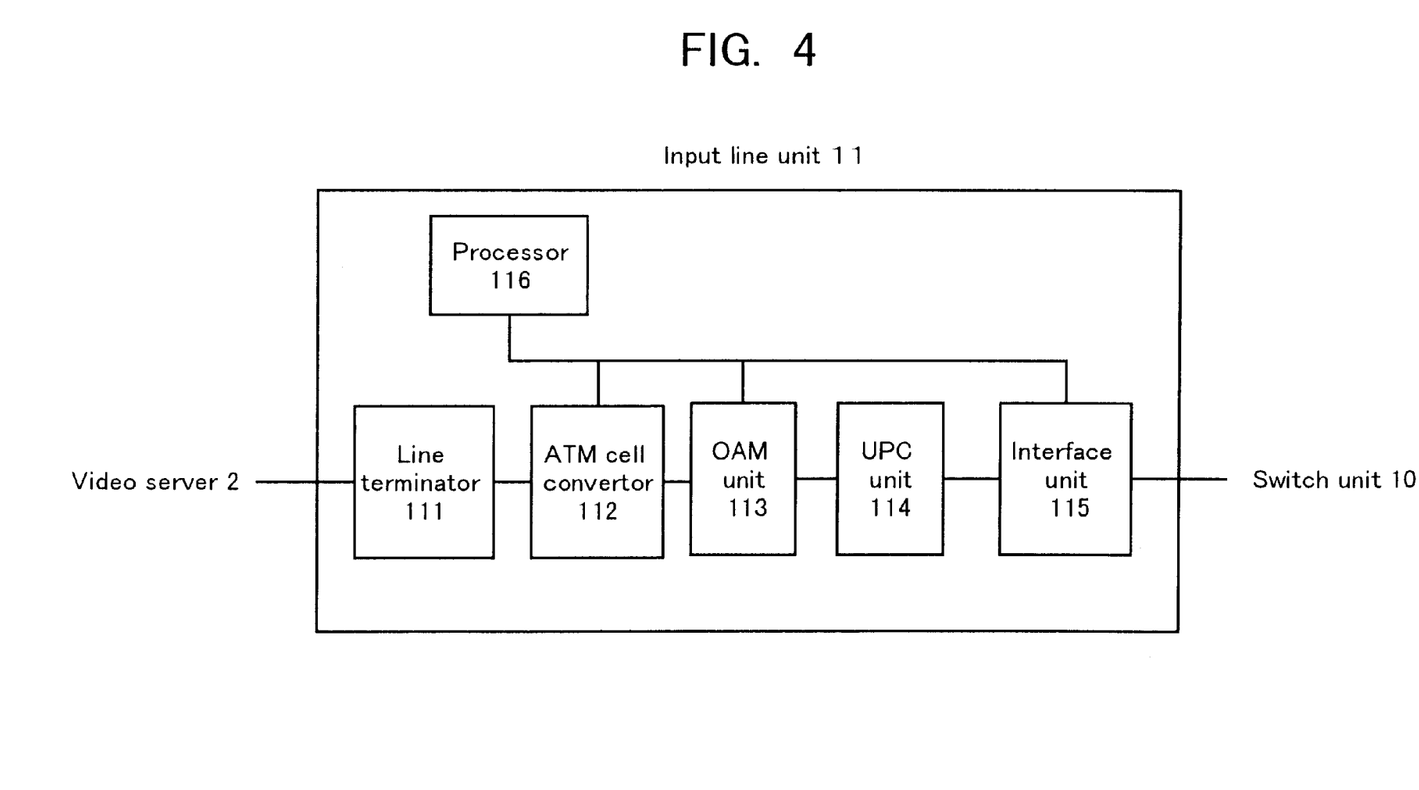
FIG. 4 is a block diagram showing the arrangement of an input line unit.

FIG. 4 is a block diagram illustrating the arrangement of the input line unit 11. In FIG. 4, the input line unit 11 includes a line terminator 111, an ATM cell converter 112, an OAM unit 113 and an UPC unit 114, and an interface unit 115 and a processor 116.

The line terminator 111 terminates an input line along which an ATM cell is transferred. The ATM cell converter 112 extracts from the header of a received ATM cell the VPI and the VCI of an input connection which is set along the input line. The ATM cell converter 112 then converts the VPI and the VCI extracted from the input connection (which are hereinafter referred to simply as the VPI and the VCI) into a VPI and a VCI for an output connection set for the output line (which are hereinafter simply referred to as the OVPI and OVCI).

The OAM unit 113 determines whether the lines and the ATM switch 1 are operated normally, and monitors the loss of ATM cells. The UPC unit 1145 monitors the flow rate for the ATM cells via the input connection. The interface unit 115 serves as an interface between the input line unit 11 and the switch unit 10. The processor 116 controls the individual units of the input line unit 11.

A more detailed explanation will now be given for the ATM cell converter 112. Included in the ATM cell converter 112 is a memory in which is stored a conversion table for VPIs and VCIs, and OVPIs and OvCIs, and which employs the conversion table for converting the VPI and the VCI into the OVPI and the OVCI.

Figure 5:
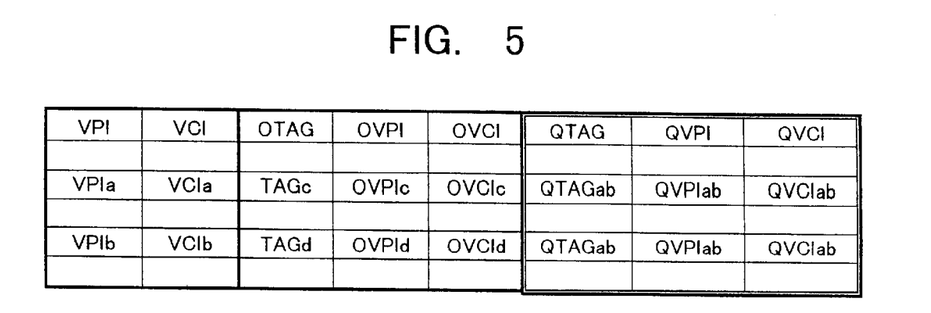
FIG. 5 is a diagram showing an example conversion table according to the embodiment of the present invention.

FIG. 5 is an example conversion table according to the embodiment of the present invention. In FIG. 5, the VPIa and VCIa of the input connection correspond to the OVPIC and OVCIc of the output connection, and the VPIb and VCIb correspond to the OVPId and OVCId. It should be noted that an OTAG is an identifier for identifying an output line for which an output connection has been set, and that the output connection is specified by the OTAG, OVPI and OVCI.

Furthermore, in this embodiment, QTAG, QVPI and QVCI, which constitute the bandwidth and the quality information for controlling the bandwidth and the quality of the ATM connection, are set in the conversion table in advance. Also in this embodiment, the bandwidth and the quality information are set for each TAG, VPI and VCI, but they may be provided by a single information element.

Since the bandwidth and the quality information are set in the conversion table in advance, unlike the prior art the bandwidth and the quality information for the ATM connection need not be calculated by the operating unit 116 based on the VPI, VCI, OTAG, OVPI and OVCI. According to the conventional technique, the bandwidth and the quality information for the ATM connection obtained by the operating unit 116 is transferred with an ATM cell to the switch unit 10, and is further transferred to the read controller 104 in the switch unit 10. The read controller 104 employs the bandwidth and the quality information to read an ATM cell from the common buffer 102. Therefore, even when the bandwidth and the quality for the connection are the same for a plurality of channels, the calculation at the operating unit 116 and the release and setup of the internal connection are performed each time channels are switched. The process for releasing the internal connection consists of a process for releasing an area in the common buffer 102 whereat are stored the ATM cells for the pre-switching ATM connection. The process for setting the internal connection is a process for setting in the common buffer 102 an area wherein is stored the ATM cell for the post-switching ATM connection. Conventionally, an extended period of time is required for the calculation of the bandwidth and the quality information and for the release and the setting of the internal connection, and immediate channel switching can not be provided.

on the other hand, according to the embodiment of the present invention, as is described above, since the bandwidth and the quality information QTAG, QVPI and QVCI are provided in advance, they need not be calculated by the operating unit 116. The bandwidth and the quality information are transferred to the read controller 104 of the switch unit 10. When the bandwidth and the quality information for the pre-switching ATM connection are the same as those for the post-switching ATM connection, the internal connection for the pre-switching ATM connection is not released, but instead is employed for the post-switching ATM connection.

The same bandwidth and quality information, QTAGac, QVPIac and QVCIac are set, for example, for two ATM connections in FIG. 5. When channels are switched, the read controller 104 of the switch unit 10 does not set a new internal connection for controlling the bandwidth and the quality of the ATM connection, and reads an ATM cell via an internal connection which was set before the channels were switched.

Figure 6A:
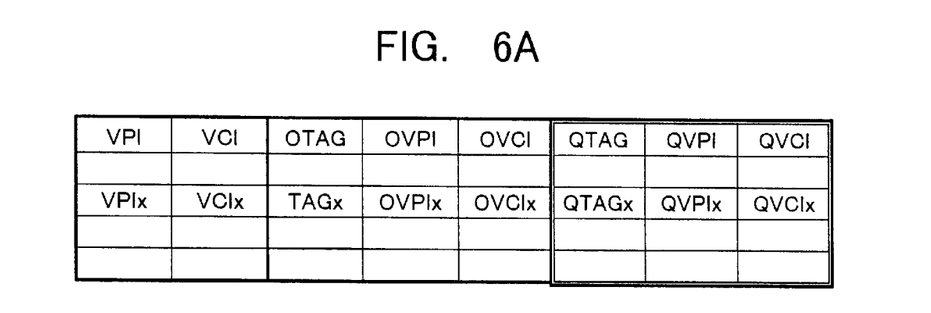
FIG. 6A and 6B are diagrams showing another example conversion table according to the embodiment of the present invention.
Figure 6B:
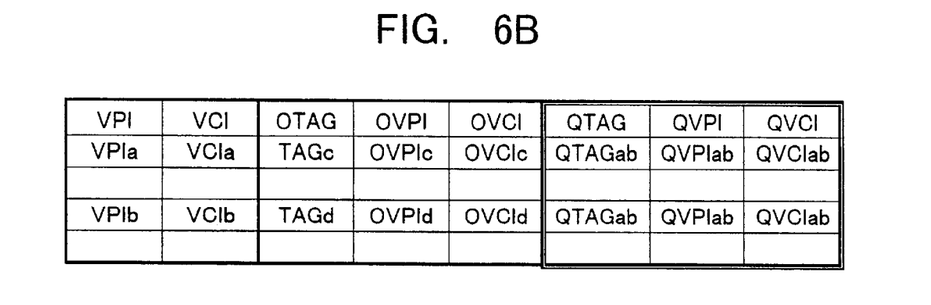

FIG. 6 is a diagram showing another conversion table according to the embodiment of the present invention. In FIG. 6 are provided a table (FIG. 6A) in which the bandwidth and the quality information differ for each ATM connection, and a table (FIG. 6B) in which the bandwidth and the quality information for ATM connections are the same. In the conversion table in FIG. 6A, different bandwidth and quality information, QTAGxy, QVPIxy and QVCIxy (subscript characters x and y are arbitrary numbers falling within a predetermined range which are added to the input/output connections), are provided for the individual ATM connections. In FIG. 6B, the same bandwidth and quality information, QTAGac, QVPIac and QVCIac (subscript characters a and c are predetermined numbers falling outside the predetermined range which are added to the input/output connections), are provided for all the ATM connections.

Since two such tables are prepared, the ATM connection for which the internal connection is set each time channels are switched, and the ATM connection which is used with the same internal connection even when channels are switched can coexist.

The two tables in FIGS. 6A and 6B are branched in accordance with the VPI number for the input connection. That is, the VPI number of the input connection is a number x which falls within the predetermined range, and the ATM cell converter 112 of the input line unit 11 obtains the bandwidth and quality information from the table in FIG. 6A. When the VPI number of the input connection is a number a which falls outside the predetermined range, the ATM cell converter 112 obtains the bandwidth and the quality information from the table in FIG. 6B. Therefore, for each VPI it is possible to exercise both the conventional connection control according to which an internal connection is set each time channels are switched, and the connection control described in this embodiment, according to which, even when channels are switched, the internal connection for the pre-switching input/output connection is also employed for the post-switching input/output connection.

The two tables in FIGS. 6A and 6B may be branched in accordance with, for example, the VCI of the input connection. That is, when the VCI number of the input connection falls within the predetermined range, similarly, the ATM cell converter 112 obtains the bandwidth and the quality information from the table in FIG. 6A. When the VCI number of the input connection is a number a which falls outside the predetermined range, the ATM cell converter 112 obtains the bandwidth and the quality information from the table in FIG. 6B. As a result, for each VCI the conventional connection control and the connection control described in this embodiment can be exercised.

Figure 7:
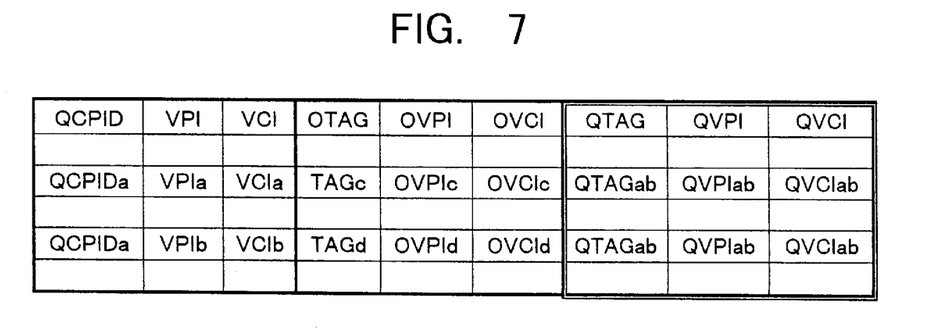
FIG. 7 is a diagram showing an additional example conversion table according to the embodiment of the present invention.

FIG. 7 is a diagram showing an additional example conversion table according to the embodiment of the present invention. In FIG. 7, at the input connection a bandwidth and a quality control connection identifier (QCCNID), which specifies the bandwidth and the quality information for the ATM connection, is set in the header of an ATM cell in addition to the VPI and the VCI.

Therefore, the ATM cell converter 112 of the input line unit 1 obtains the QCCNID from the header of an ATM cell at the input connection, and searches the table in FIG. 7 based on the obtained QCCNID. Then, when the QCCNID of the pre-switching input connection is the same as the QCCNID of the post-switching input connection, the ATM cell converter 112 converts the bandwidth and the quality information into QTAGac, QVPIac and QVCIac, which have the same values. Since the read controller 104 of the switch unit 10 receives the same bandwidth and quality information, it does not perform the release process and the setup process for the internal connection, and links the post-switching input connection with the post-switching output connection via the pre-switching internal connection.

Figure 8:
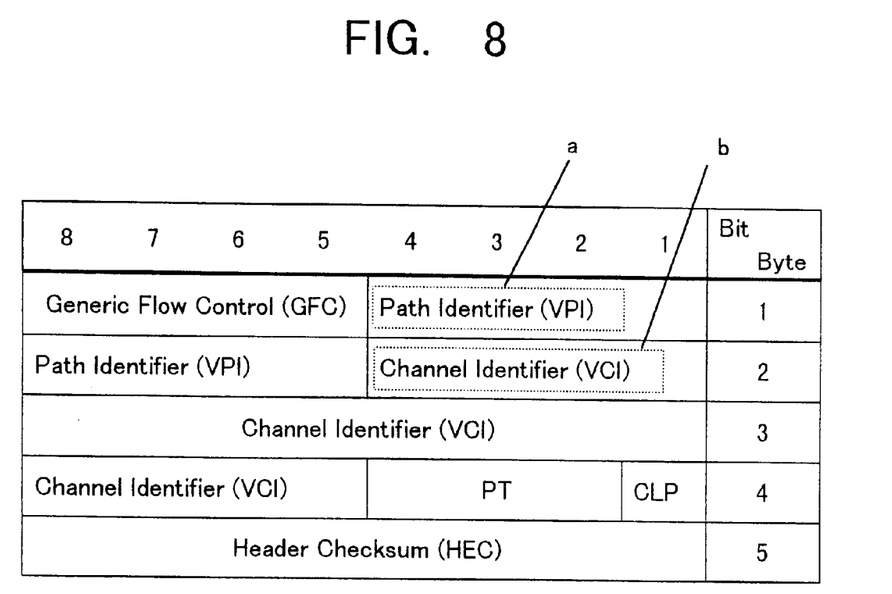
FIG. 8 is a diagram showing the structure of the header portion of an ATM cell.

FIG. 8 is a diagram showing the structure of the header of an ATM cell. In FIG. 8, QCCNID is written in an unused upper three bit area (portion a enclosed by broken lines) in the VPI area. The QCCNID may be written in an unused upper four bit area (portion b enclosed by a broken line) in the VCI area, or may be written in an unused area (e.g., a QFC area of four bits) in the ATM cell header.

Figure 9:
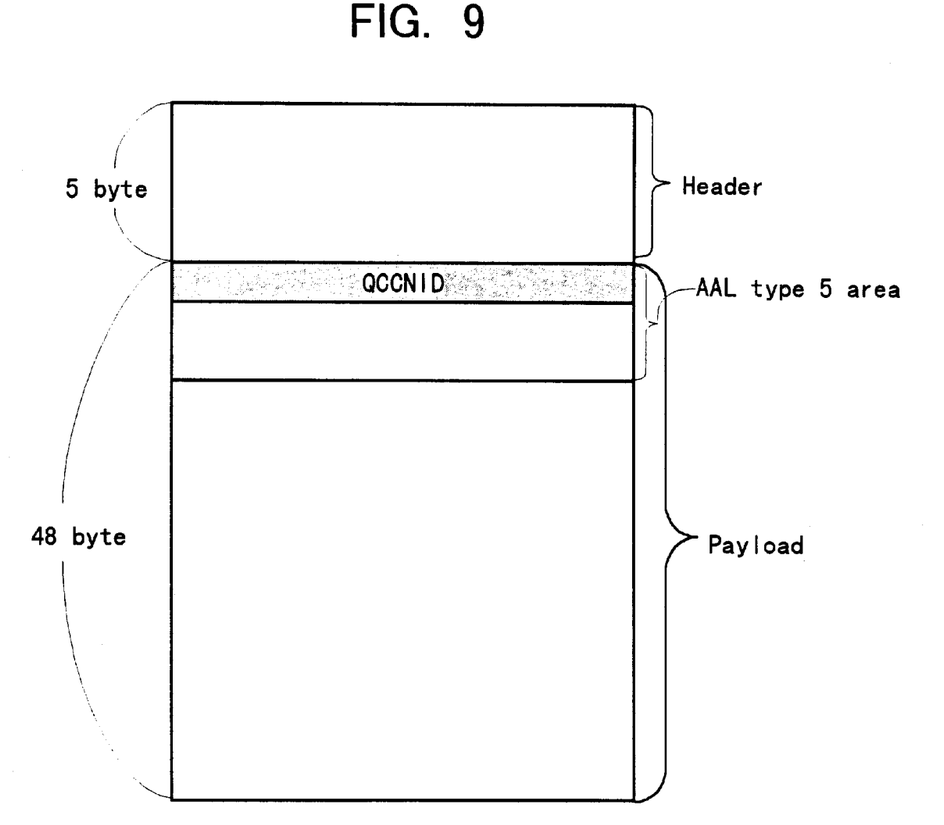
FIG. 9 is a diagram showing the overall structure of an ATM cell.

FIG. 9 is a diagram showing the overall structure of an ATM cell. In FIG. 9, the QCCNID may be written in a predetermined region in an AAL (ATM Adaption Layer) type 5 area, which is set in a payload portion. The AAL type 5 area is a layer which is located in the upper portion of the ATM layer in the hierarchial structure of the ATM protocol, and which acquires a match or adjusts the data unit of an upper application and the data unit of the payload of an ATM cell.

Figure 10A:
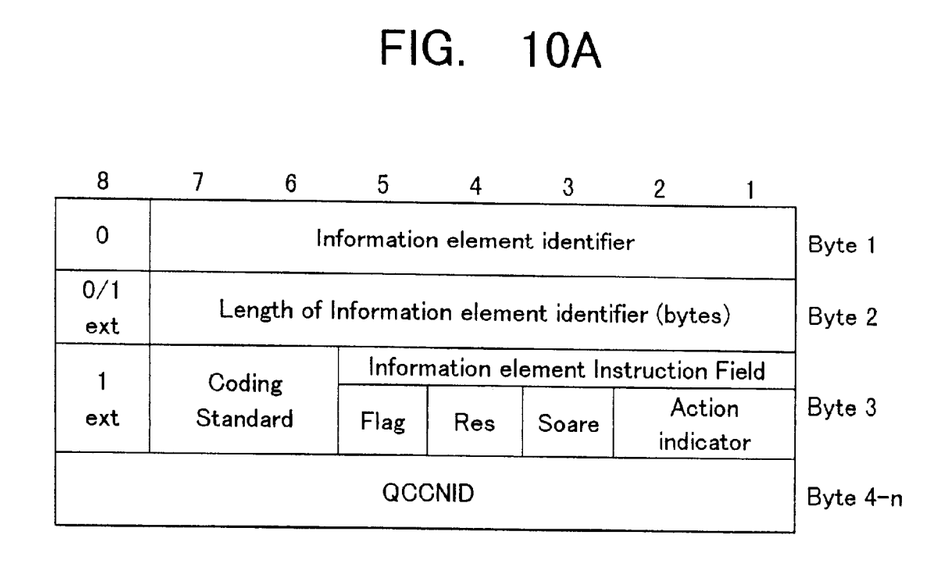
FIG. 10A and 10B are diagrams showing the structure of the information elements included in a signal message.
Figure 10B:
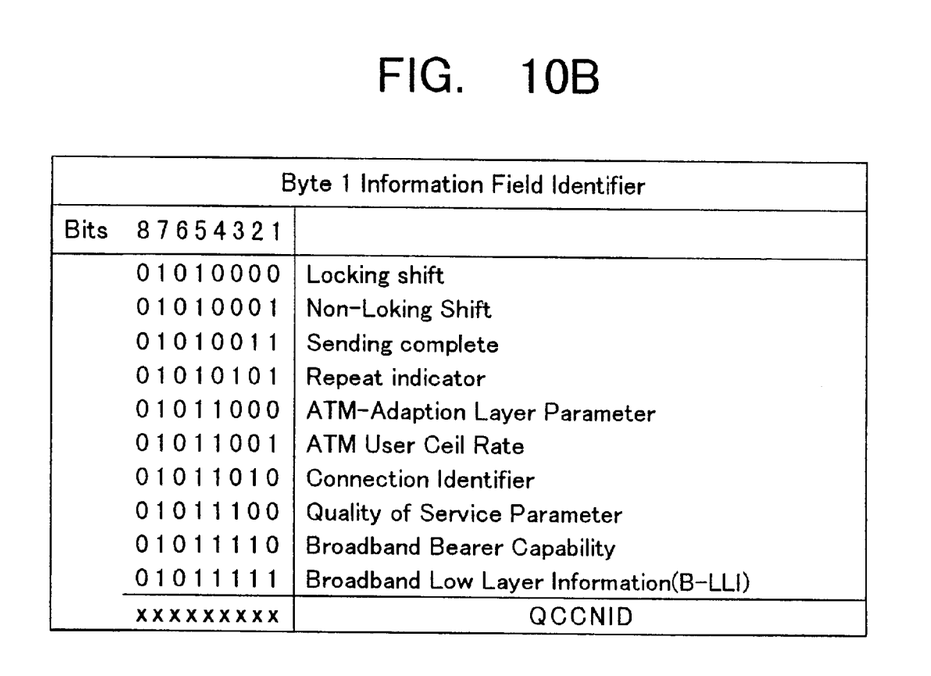

FIG. 10A is a diagram showing the structure of the information elements included in a signal message which is transmitted by the STB 3 to the ATM switch 1 to control a connection, such as the setup or the release of the connection. In FIG. 10A, the QCCNID is written in the fourth byte or in the following bytes. FIG. 10B is a diagram showing an information element identifier to be written in the first byte of the structure in FIG. 10A, and a QCCNID identifier which is newly set. The QCCNID information element is included in a signal message requesting channel switching. The signal message is transmitted to the ATM switch 1 along a signal line (not shown in FIG. 2), and the QCCNID information element in the message is obtained by the ATM cell converter 112 of the input line unit 11. Then, the above described connection control according to this embodiment is performed.

As is described above, according to the present invention, since the release and setup processes for the internal connection are not required for the switching of channels between ATM connections having the same bandwidth and quality, switching of the channels can be accomplished in a moment.

The present invention may be embodied in other specific forms without departing from the spirit or essential characteristics thereof. The present embodiment is therefore to be considered in all respects as illustrative and not restrictive, the scope of the invention being indicated by the appended claims rather than by foregoing description and all change which come within the meaning and range of equivalency of the claims are therefore intended to be embraced therein.

What is claimed is:

1. An ATM switch which forms ATM connection by linking an input connection with an output connection via an internal connection for controlling the bandwidth and the quality of said ATM connection, comprising:

an input line unit for terminating ATM cells input via said input connection;

an output line unit for outputting said ATM cells to said output connection; and a switch unit for switching a first ATM connection formed by linking a first input connection with a first output connection via a first internal connection, to a second ATM connection, which has the same bandwidth and quality as said first ATM connection, formed by linking a second input connection with a second output connection via said first internal connection.

2. The ATM switch according to claim 1, wherein said input line unit comprises a converter for converting input connection information included in said ATM cells input from said input connections into output connection information, and for obtaining a bandwidth and quality information for said ATM connection based on said input connection information; and wherein said switch unit links said second input connection with said second output connection via said first internal connection in case that said bandwidth and quality information for the second ATM connection is the same as a bandwidth and quality information for said first ATM connection.

3. The ATM switch according to claim 2, wherein said converter has a memory which stores table data for said output connection information and said bandwidth and quality information for said ATM connections which are set in accordance with said input connection information, and from which it obtains said bandwidth and quality information.

4. The ATM switch according to claim 3, wherein said input connection information includes a virtual path identifier (VPI) for said input connections, and wherein in said table said bandwidth and quality information are set separately for a range that said bandwidth and quality information are the same and a range that said bandwidth and quality information are different for each of said input connections in accordance with said virtual path identifier.

5. The ATM switch according to claim 3, wherein said input connection information includes a virtual channel identifier (VCI) for said input connections, and wherein in said table said bandwidth and quality information are set separately for a range that said bandwidth and quality information are the same and a range that said bandwidth and quality information are different for each of said input connections in accordance with said virtual channel identifier.

6. The ATM switch according to claim 3, wherein said input connection information includes a bandwidth and quality identifier (QCCNID) in accordance with said bandwidth and quality information, and wherein said converter identifies said bandwidth and quality information based on said bandwidth and quality identifier.

7. The ATM switch according to claim 6, wherein said is bandwidth and quality identifier is set in a virtual path identifier (VPI) area for each of said input connections in the header of each of said ATM cells.

8. The ATM switch according to claim 6, wherein said bandwidth and quality identifier is set in a virtual channel identifier (VCI) area for each of said input connections in the header of each of said ATM cells.

9. The ATM switch according to claim 6, wherein said bandwidth and quality identifier is set in an unused area in the header of each of said ATM cells.

10. The ATM switch according to claim 6, wherein said bandwidth and quality identifier is set in the payload of each of said ATM cells.

11. The ATM switch according to claim 6, wherein said bandwidth and quality identifier is set in a signal message for controlling an ATM connection.

12. A method for controlling the bandwidth and the quality for an ATM connection formed by linking an input connection with an output connection via an internal connection for controlling the bandwidth and the quality of said ATM connection, comprising the steps of:

linking a first input connection with a first output connection via a first internal connection for controlling said bandwidth and quality of a first ATM connection; and linking a second input connection with a second output connection via said first internal connection when said first ATM connection is switched to a second ATM connection which has the same bandwidth and the same quality as said first ATM connection.

13. The method for controlling the bandwidth and the quality of ATM connections according to claim 12, further comprising the steps of:

obtaining a bandwidth and quality information for said first ATM connection and a bandwidth and quality information for said second ATM connection based on input connection information included in ATM cells input from said first and second connections respectively; and comparing said bandwidth and quality information for said first ATM connection with said bandwidth and quality information for said second ATM connection.

14. The method for controlling the bandwidth and the quality of ATM connections according to claim 13, further comprising the step of:

linking said second input connection with said second output connection via a second internal connection for controlling bandwidth and quality for said second ATM connection, when, at said comparison step, said bandwidth and quality information for said first ATM connection is different from said bandwidth and quality information for said second ATM connection.

* * * * *